US012637071B2

(12) United States Patent　　　　(10) Patent No.:　US 12,637,071 B2

Linkowski et al.　　　　　　　　　　(45) **Date of Patent:　\*May 26, 2026**

(54) INFRASTRUCTURE-BASED VEHICLE MANAGEMENT

(71) Applicant: Ford Global Technologies, LLC, Dearborn, MI (US)

(72) Inventors: Gregory P. Linkowski, Dearborn, MI (US); Mario A. Santillo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,599

(22) Filed: Mar. 8, 2024

(65) Prior Publication Data

US 2024/0208495 A1　　　Jun. 27, 2024

Related U.S. Application Data

(63) Continuation of application No. 17/210,816, filed on Mar. 24, 2021, now Pat. No. 11,975,710.

(51) Int. Cl.
| | |
|---|---|
| *B60W 30/095* | (2012.01) |
| *G05D 1/00* | (2024.01) |
| *G05D 1/226* | (2024.01) |
| *G05D 1/617* | (2024.01) |

(Continued)

(52) U.S. Cl.
CPC ....... *B60W 30/0956* (2013.01); *G05D 1/0022* (2013.01); *G05D 1/0214* (2013.01); *G05D 1/226* (2024.01); *G05D 1/617* (2024.01); *G08G 1/0133* (2013.01); *B60W 2554/402* (2020.02);

(Continued)

(58) Field of Classification Search
CPC ....... B60W 30/0956; B60W 2554/402; B60W 2554/4041; B60W 2556/45; G05D 1/0022; G05D 1/0214; G05D 1/226; G05D 1/617; G08G 1/0133; G08G 1/164; H04W 4/04; H04W 4/44; H04W 4/023; H04W 4/029; H04L 67/12; H04L 67/52
See application file for complete search history.

(56) References Cited

U.S. PATENT DOCUMENTS

| | | | |
|---|---|---|---|
| 7,791,503 | B2 | 9/2010 | Breed et al. |
| 11,975,710 | B2 * | 5/2024 | Linkowski ............ H04W 4/023 |
| 2016/0378111 | A1 | 12/2016 | Lenser et al. |

(Continued)

FOREIGN PATENT DOCUMENTS

CN　　　　110070746　A　　　7/2019

OTHER PUBLICATIONS

Automated Vehicle Entry System Bangalore, Automat.co.in, https://www.automat.co.in/automated-vehicle-entry.html.

*Primary Examiner* — Tarek Elarabi

(74) *Attorney, Agent, or Firm* — Vincent Mastrogiacomo; Brooks Kushman P.C.

(57) ABSTRACT

A vehicle can be detected approaching a limited operation zone of a travel area. It can be determined that the vehicle is able to execute wireless commands from a computer. The object can be identified within the limited operation zone. Based on identifying the object within the limited operation zone, the vehicle can be controlled by providing a control command via wireless communications, the control command including whether the vehicle is permitted to enter the limited operation zone.

20 Claims, 4 Drawing Sheets

(51) Int. Cl.
 *G08G 1/01* (2006.01)
 *H04W 4/44* (2018.01)

(52) U.S. Cl.
 CPC . *B60W 2554/4041* (2020.02); *B60W 2556/45*
 (2020.02); *H04W 4/44* (2018.02)

(56) References Cited

U.S. PATENT DOCUMENTS

| 2018/0191390 A1* | 7/2018 | Barry | H04W 4/40 |
| 2018/0194352 A1 | 7/2018 | Avedisov et al. | |
| 2018/0350238 A1* | 12/2018 | Atlinger | G05D 1/0212 |
| 2019/0011913 A1 | 1/2019 | Chu | |
| 2019/0082377 A1 | 3/2019 | Silver | |
| 2019/0389456 A1 | 12/2019 | Vora et al. | |
| 2021/0009392 A1* | 1/2021 | Kamiya | G05D 1/0022 |
| 2021/0258719 A1* | 8/2021 | Bosworth | H04W 4/44 |

* cited by examiner

INFRASTRUCTURE-BASED VEHICLE MANAGEMENT

CROSS-REFERENCE TO RELATED APPLICATION

This application is a continuation of, and as such claims priority to, co-pending U.S. patent application Ser. No. 17/210,816, filed on Mar. 24, 2021, which is hereby incorporated herein by reference in its entirety.

BACKGROUND

A vehicle that operates autonomously or semi-autonomously depends on sensors for automated operation. For example, vehicle sensors can detect an object near the vehicle. Detecting an object can result in a vehicle operation such as braking or accelerating, turning, modifying a planned or current path of travel, etc. However, if an object and/or future portion of a travel path is not within the field of view, or is obstructed within a field of view, of a vehicle sensor, then vehicle operations can be impaired.

DESCRIPTION

Figure 1:
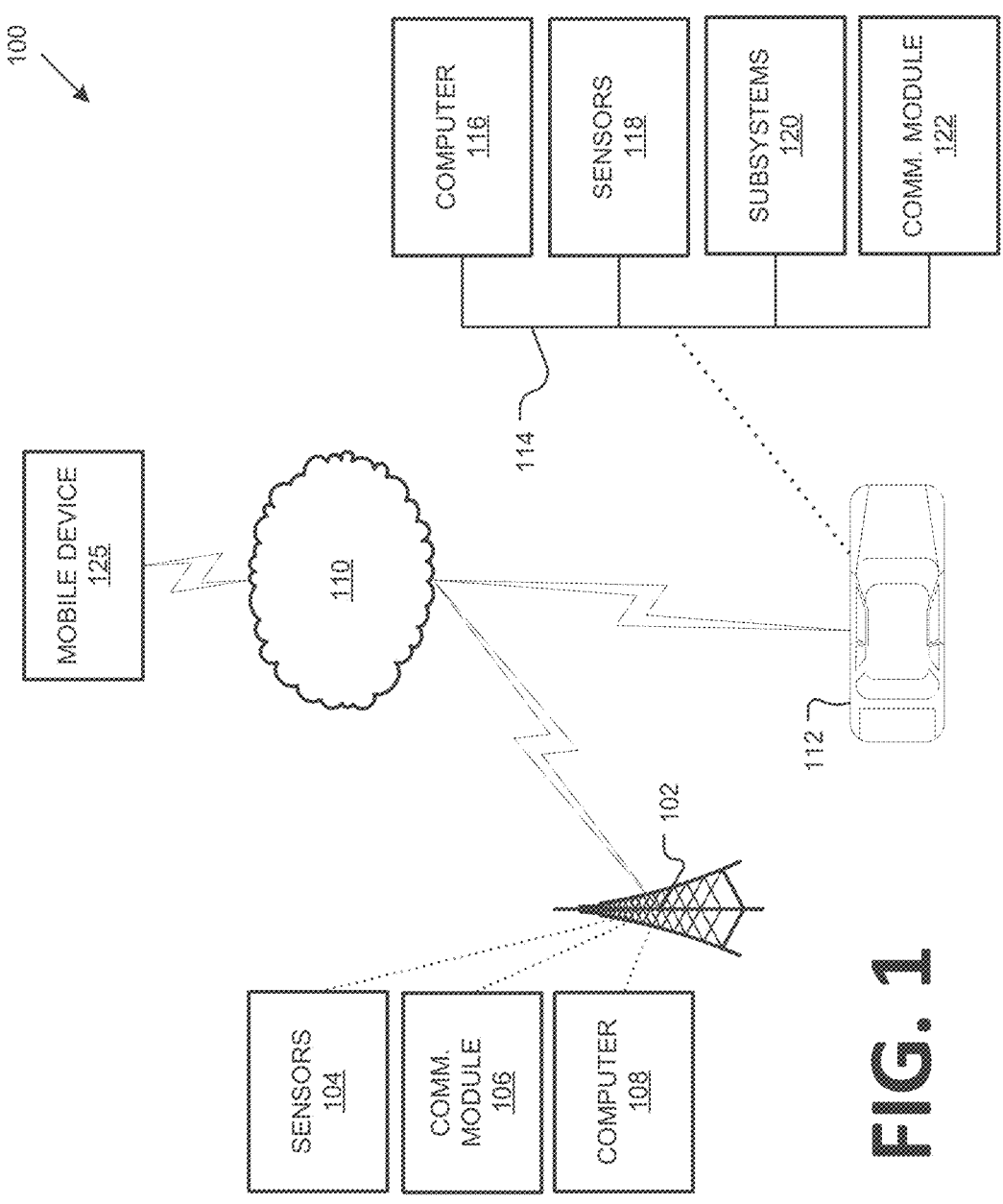
FIG. 1 is a block diagram of a traffic management system.
Figure 2:
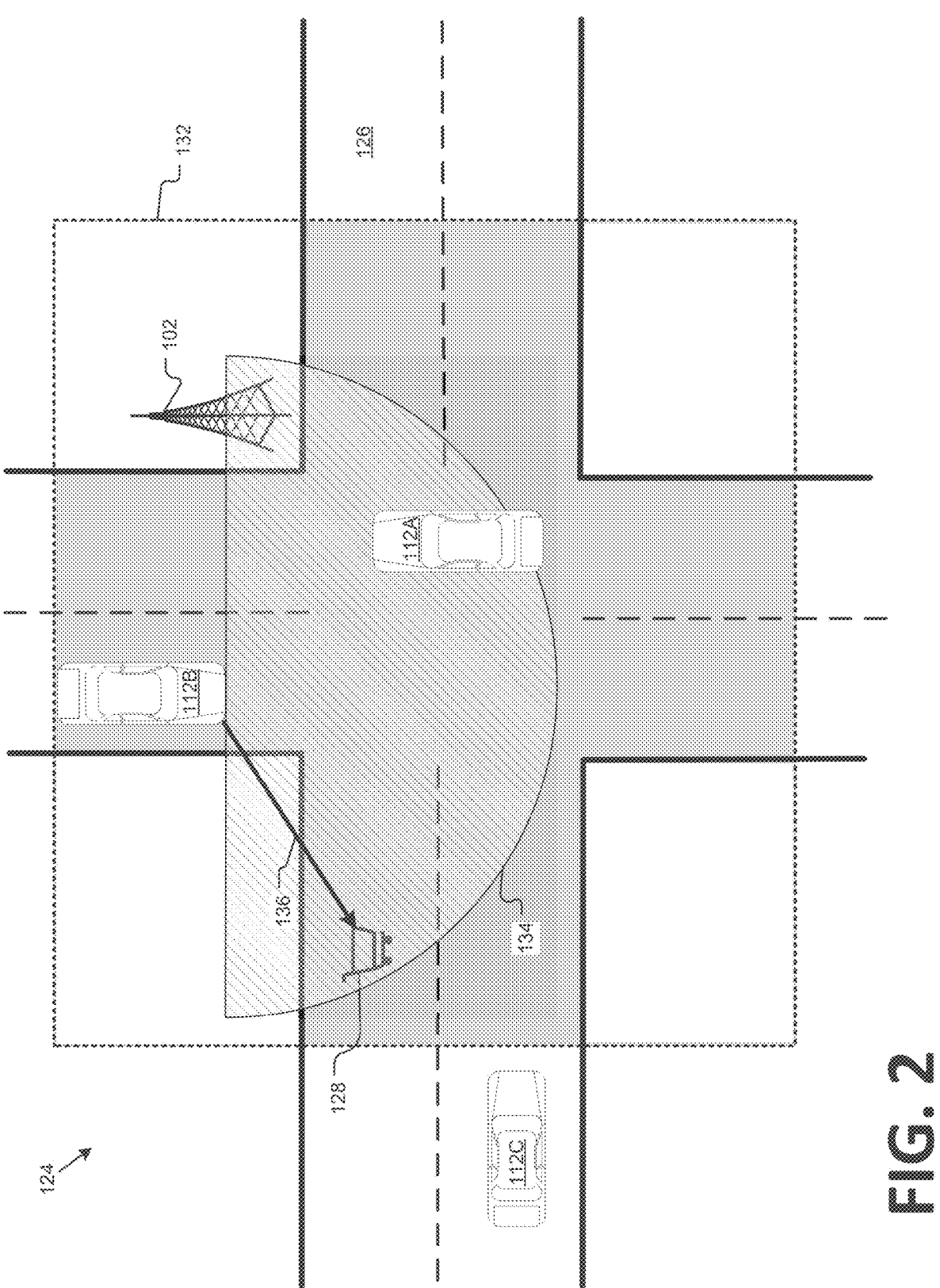
FIG. 2 is a top view of a traffic scene for which the traffic management system could be implemented.
Figure 3:
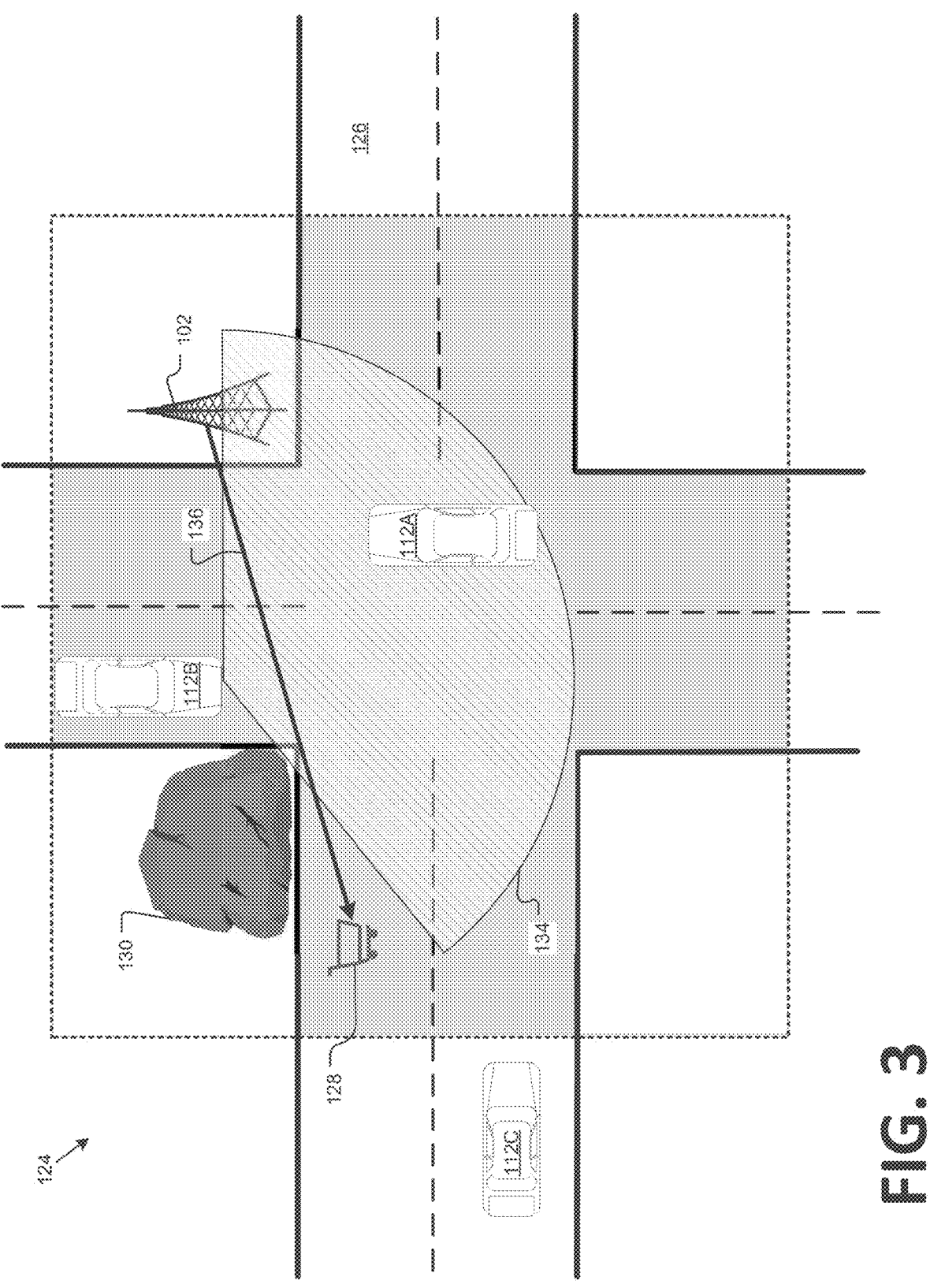
FIG. 3 is another example of a top view of the traffic scene for which the traffic management system could be implemented.

With reference to FIGS. 1-3, a traffic management system 100 can be provided to manage a traffic area. The traffic management system 100 can include one or more infrastructure nodes 102 to monitor and/or provide control messages to one or more vehicles 112 in the traffic area. For example, if vehicle sensors 118 are blocked or obstructed from a portion of the traffic area, an infrastructure node 102 can provide a control message to assist the vehicle 112 in planning and/or executing a path. Further, the infrastructure node 102 can detect objects in the traffic area, e.g., pedestrians and/or vehicles 112 lacking communication capability, and can accordingly provide control messages to vehicles 112 that do have communication capability. For example, vehicles 112 and/or other devices can communicate wirelessly, e.g., using protocols that provide for direct communication and/or via a communication network 110.

An infrastructure node 102 can include one or more infrastructure sensors 104, an infrastructure communication module 106, and a computer, the infrastructure node 102 computer including a processor and a memory, the memory storing instructions executable by the processor. The instructions in an infrastructure node 102 computer typically include instructions to detect a vehicle 112 approaching a limited operation zone 132 of a travel area 126; determine that the vehicle 112 is able to execute wireless commands from the computer; identify an object within the limited operation zone 132; and, based on identifying the object within the limited operation zone 132, control the vehicle 112 by providing a control command via wireless communications, the control command including whether the vehicle 112 is permitted to enter the limited operation zone 132.

Accordingly, described herein is system, comprising a computer that includes a processor and a memory, the memory storing instructions executable by the processor. The instructions include instructions to detect a vehicle approaching a limited operation zone of a travel area. The instructions further include instructions to determine that the vehicle is able to execute wireless commands from the computer. The instructions further include instructions to identify an object within the limited operation zone. The instructions further include instructions to, based on identifying the object within the limited operation zone, control the vehicle by providing a control command via wireless communications, the control command including whether the vehicle is permitted to enter the limited operation zone.

The instructions can further include instructions to determine that the vehicle is unable to execute the wireless commands from the computer, and to then suppress the control command to the vehicle.

The instructions can further include instructions to determine that the object within the limited operation zone is unable to receive the wireless commands from the computer, wherein the control command then includes a directive for the vehicle to halt prior to entering the limited operation zone.

The instructions can further include instructions to determine that the identified object within the limited operation zone, and any second object identified in the limited operation zone, is able to execute the wireless commands from the computer, wherein the control command then includes a permission to enter the limited operation zone.

The instructions can further include instructions to determine a location of the object, wherein the control command includes a directive to follow a path to avoid the location of the object. The location of the object can be a location on a predicted path of the object.

The instructions can further include instructions to determine a type of the object, wherein the control command is based in part on the type of the object.

The instructions can further include instructions to determine that the limited operation zone is unoccupied, wherein the control of the vehicle includes permitting the vehicle to enter the limited operation zone based on the limited operation zone being unoccupied.

The instructions can further include instructions to detect the vehicle from data provided from a stationary sensor.

The instructions can further include instructions to identify the object from a wireless transmission from a device co-located with the object.

The object can be a human user, and the device co-located with the object can be a portable computing device.

The object can be a second vehicle, and the device co-located with the object can be a vehicle communication module.

A method comprises detecting a vehicle approaching a limited operation zone of a travel area; determining that the vehicle is able to execute wireless commands from a computer; identifying an object within the limited operation zone; and based on identifying the object within the limited operation zone, controlling the vehicle by providing a control command via wireless communications, the control command including whether the vehicle is permitted to enter the limited operation zone.

The method can further comprise determining that the vehicle is unable to execute the wireless commands from the computer, and then suppressing the control command to the vehicle.

The method can further comprise determining that the object within the limited operation zone is unable to receive the wireless commands from the computer, wherein the control command then includes a directive for the vehicle to halt prior to entering the limited operation zone.

The method can further comprise determining that the identified object within the limited operation zone, and any second object identified in the limited operation zone, is able to execute the wireless commands from the computer, wherein the control command then includes a permission to enter the limited operation zone.

The method can further comprise determining a location of the object, wherein the control command includes a directive to follow a path to avoid the location of the object.

The method can further comprise determining a type of the object, wherein the control command is based in part on the type of the object.

The method can further comprise determining that the limited operation zone is unoccupied, wherein the control of the vehicle includes permitting the vehicle to enter the limited operation zone based on the limited operation zone being unoccupied.

The method can further comprise detecting the vehicle from data provided from a stationary sensor.

Continuing with reference to FIG. 1, the infrastructure node 102 computer may be configured for communicating via the infrastructure communication module 106 with various devices, including a vehicle communication module 122, e.g., through a vehicle 112 to vehicle (V2V) or vehicle-to-infrastructure or everything (V2X), vehicle-to-everything including cellular vehicle-to-everything (CV2X) wireless communications (cellular and/or DSRC., etc.) to another vehicle 112, to another infrastructure node and/or a remote server (not shown). The infrastructure communication module 106 could include one or more mechanisms for communication with other devices (including vehicle communication modules 122 by which the computers 116 of vehicles 112 may communicate), including any desired combination of wireless (e.g., cellular, wireless, satellite, microwave and radio frequency) communication mechanisms and any desired network topology (or topologies when a plurality of communication mechanisms are utilized). exemplary communications provided via the module can include cellular, Bluetooth, IEEE 802.11, dedicated short range communications (DSRC), cellular V2X (C-V2X), and the like.

An infrastructure node 102 can include a variety of infrastructure sensors 104. A "sensor" is a device that can obtain one or more measurements of one or more physical phenomena. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Sensor operation can be affected by obstructions, e.g., dust, snow, insects, etc. Often, but not necessarily, a sensor includes a digital-to-analog converter to converted sensed analog data to a digital signal that can be provided to a digital computer, e.g., via a network. Sensors can include a variety of devices, and can be disposed to sense and environment, provide data about a machine, etc., in a variety of ways. For example, an infrastructure sensor 104 could be mounted to a stationary infrastructure node 102 on, over, or near a traffic area 126 (sec FIGS. 2-3), e.g., including a road. A vehicle sensor 118 could be mounted in or on a vehicle 112. Further, other sensors, in or on a vehicle 112, stationary infrastructure node 102, etc., could include cameras, short range radar, long range radar, LIDAR, and/or ultrasonic transducers, weight sensors, accelerometers, motion detectors, etc., i.e., sensors to provide a variety of data. To provide just a few non-limiting examples, sensor data could include data for determining a position of a component, a location of an object, a speed of an object, a type of an object, a slope of a roadway, a temperature, a presence or amount of moisture, a fuel level, a data rate, etc.

The infrastructure computer 108 includes a processor and a memory such as are known. The memory includes one or more forms of computer readable media, and stores instructions executable by the infrastructure computer 108 for performing various operations, including as disclosed herein. For example, the infrastructure computer 108 can be a generic computer with a processor and memory as described above and/or may include a dedicated controller for a specific function or set of functions, and/or a dedicated electronic circuit including an ASIC that is manufactured for a particular operation, e.g., an ASIC for processing sensor data and/or communicating the sensor data. In another example, computer may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer. The memory can be of any type, e.g., hard disk drives, solid state drives, servers, or any volatile or non-volatile media. The memory can store the collected data sent from the infrastructure sensors 104. The memory can be a separate device from the infrastructure computer 108, and the infrastructure computer 108 can retrieve information stored by the memory via a network.

The infrastructure computer 108 can use the infrastructure communication module 106 to communicate via a communication network 110. A computer can be programmed to communicate with one or more remote sites such as a server, via a communication network 110. The communication network 110 can include one or more mechanisms by which a vehicle computer 116 may communicate with, for example, a remote server. Accordingly, the network can include one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). exemplary communication networks 110 include wireless communication networks 110 (e.g., using Bluetooth®, Bluetooth® Low Energy (BLE), IEEE 802.11, vehicle 112-to-vehicle 112 (V2V) or vehicle 112 to everything (V2X) such as cellular V2X (CV2X), Dedicated Short Range Communications (DSRC), etc.), local area networks (LAN) and/or wide area networks (WAN), including the Internet, providing data communication services.

As stated above, the traffic management system 100 can be provided for one or more vehicles 112. A vehicle 112 may be any suitable type of ground vehicle 112, e.g., an electric cart, a warehouse vehicle 112 such as a forklift, a passenger or commercial automobile such as a sedan, a coupe, a truck, a sport utility, a crossover, a van, a minivan, a taxi, a bus, a motorcycle, a bicycle, etc. Some of the vehicles 112 may include respective vehicle computers 116 that receive data from vehicle sensors 118. Further, the vehicle computer 116 and/or a human operator may provide input to various vehicle subsystems 120, e.g., a navigation system, a braking system, propulsion system, and/or steering system. A vehicle 112 can include a vehicle communication module 122 for communicating with other vehicles 112, devices and/or an infrastructure node 102.

A vehicle network 114 can include a conventional vehicle 112 communications bus such as a CAN bus, LIN bus, etc., and/or could include other wired and/or wireless technologies, e.g., Ethernet, Wi-Fi®, cellular, Bluetooth®, Bluetooth® Low Energy (BLE), etc. Via the network, bus, and/or other wired or wireless mechanisms (e.g., a wired or wireless local area network in the vehicle 112). Accordingly, a vehicle computer 116, ECU etc., may transmit messages to various devices in a vehicle 112 and/or receive messages from the various devices, e.g., ECUs, controllers, actuators, sensors, etc.

A vehicle computer 116 includes a processor and a memory such as are known, and can communicate via the vehicle network 114. The computer can be a generic computer with a processor and memory as described above and/or may include an electronic control unit (ECU) or controller for a specific function or set of functions. Alternatively or additionally, in cases where the computer actually comprises a plurality of devices, the vehicle 112 communication network 110 may be used for communications between devices represented as the computer in this disclosure. Further, as mentioned below, various controllers and/or sensors may provide data to the computer via the vehicle network 114.

The vehicle sensors 118 can communicate on the vehicle network 114 with various vehicle 112 components such as the vehicle computer 116. The vehicle sensors 118 are similar to the infrastructure sensors 104 and therefore other than the following will not be described separately to avoid repetition. Some vehicle sensors 118 detect internal states of the vehicle 112, for example, wheel speed, wheel orientation, and engine and transmission variables. Some sensors detect the position or orientation of the vehicle 112, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Moreover, various controllers in a vehicle 112 may operate as sensors to provide data via the vehicle network 114 or bus, e.g., data relating to vehicle 112 speed, acceleration, location, subsystem and/or component status, etc.

As mentioned above, vehicle subsystems 120 can include a navigation system. The navigation system can be implemented via circuits, chips, or other electronic components that can determine a present location of the vehicle 112. The navigation system may be implemented via a satellite-based system such as the Global Positioning System (GPS) and/or could include real-time-kinematic (RTK) positioning. The navigation system may triangulate the location of the vehicle 112 based on signals received from various satellites in the Earth's orbit. The navigation system is programmed to output signals representing the present location of the vehicle 112, e.g., the computer via a vehicle 112 communication network 110. In some instances, the navigation system is programmed to determine a route from the present location of the vehicle 112 to a future location. The navigation system may access a map stored in memory and develop the route according to the map data. In some examples, the navigation system may also send a request to a server remote from the vehicle 112 to calculate a route to a future location and download it to the vehicle 112. The map in any event may include data specifying lanes of roads of the map, e.g., including turn lanes, a direction of traffic flow for the lanes, a speed limit, etc.

Further, in examples where the traffic management system 100 is implemented inside a building or structure, a vehicle 112 navigation system could use an indoor positioning system (IPS) that could include various suitable mechanisms to allow the vehicle computer 116 to determine a location of the vehicle 112. For example, a vehicle computer 116 could detect, e.g. via a vehicle communication module 122, an electronic signal from an infrastructure node 102, such as Wi-Fi, Bluetooth, ultra-wideband, etc., and/or could detect landmarks provided in a travel area 126, such as magnets, QR codes, infrared-visible markers, etc. Whether a vehicle 112 is outdoors using GPS or indoors using an IPS, a vehicle computer 116 could supplement these in a navigation with conventional techniques such as simultaneous location and mapping (SLAM) and/or dead-reckoning. Alternatively or additionally, the technique such as SLAM could be used alone.

The propulsion system included in vehicle subsystems 120 may include one or more of an internal combustion engine, electric motor, hybrid engine, etc.

The steering system included in vehicle subsystems 120 controls the turning of the wheels. The steering system is in communication with and receives input from a steering wheel and/or a vehicle computer 116. The steering system may include a rack-and-pinion system with electric power-assisted steering, a steer-by-wire system, e.g., such as are known, or any other suitable system.

The braking system resists the motion of the vehicle 112 to thereby slow and/or stop the vehicle 112. The braking system may include friction brakes such as disc brakes, drum brakes, band brakes, and so on; regenerative brakes; any other suitable type of brakes; or a combination. The braking system is in communication with and receives input from the computer and/or a human driver. The human driver may control the braking system via, e.g., a brake pedal.

The vehicle communication module 122 can communicate on a vehicle network 114 with various vehicle 112 components such as a vehicle computer 116, vehicle sensors 118, etc., and can communicate via wireless communications with entities outside the vehicle 112. The vehicle communication module 122 is otherwise similar to the infrastructure communication module 106 and therefore will not be further described to avoid repetition.

Turning to FIGS. 2 and 3, a traffic scene 124 includes a travel area 126. A travel area 126 herein means any ground surface designated for travel of a vehicle 112. For example, a travel area 126 can include a floor of a building, e.g., of a building corridor, plant floor, etc. A travel area 126 could include a surface of a parking structure of parking lot, or of a road, i.e., a prepared travel surface, e.g., graded dirt, asphalt, gravel, etc. A travel area 126 can include markings, e.g., paint, embedded markers, etc. to guide vehicle 112 travel, e.g., in one or more lanes. A travel area 126 can include more than one lane for vehicle 112 travel; each lane can be designated for travel in a specified direction. A travel area 126 can further include an intersection of two pathways, e.g., roads or corridors.

A traffic scene 124 can include various objects including one or more vehicles 112 and one or more stationary objects 130 and one or more mobile objects 128, all disposed on a travel area 126. An object herein means a physical, i.e., material, item that can be detected by human senses and or sensors 104, 118. Vehicles 112 are mobile objects 128, but are assigned separate reference numbers for clarity of disclosure. Likewise, an infrastructure node 102 is a stationary object 130 assigned a separate reference number for clarity of the disclosure. The traffic scene 124 can include objects proximate and/or adjacent to the travel area 126, including stationary objects 130 such as one or more infrastructure nodes 102, and, as seen in FIG. 3, a stationary object 130 proximate to an intersection of two pathways of a travel area 126.

A travel area 126 can include a limited operation zone 132. A limited operation zone 132 is a defined portion of a travel area 126 for or in which specified rules for vehicle 112 operation may be implemented. A limited operation zone 132 can be defined by location coordinates, e.g., according to a geo-fence or the like. For example, coordinate according to a global coordinate system specifying latitude and longitude coordinates for the planet earth could be used, and/or coordinates from a local coordinate system, e.g., mapping locations of a building, structure, etc., could be used. Alternatively or additionally, a limited operation zone 132 could be implemented using indicia provided in a traffic scene 124, e.g., signs or markings on a near a travel surface so as to be detectable by vehicle sensors 118, by a radio beacon or the like, e.g., an infrastructure node 102 could provide radio-frequency identification or the like.

A mobile object 128 in or on a travel area 126 may or may not be a vehicle 112. For example, FIGS. 2 and 3 include a mobile object that is not a vehicle 112, in addition to vehicles 112A, 112B, 112C. A vehicle 112 may or may not be equipped with vehicle sensors 118. Assuming that a vehicle 112 includes one or more vehicle sensors 118, the vehicle sensors 118 can detect objects within a field of view 134. A field of view 134 of a sensor is an area or volume within which the sensor can detect objects. That is, the field of view 134 can provide a line-of-sight 136 to an object. For example, in the traffic scene 124 shown in FIG. 2, the vehicle 112B has at least one vehicle sensor 118 with a field of view 134 including a line-of-sight 136 to a mobile object 128 on the travel surface. However, in the traffic scene 124 shown in FIG. 2, the one or more vehicle sensors 118 of the vehicle 112B have a field of view with no line-of-sight 136 to the mobile object 128, because the field of view 134 is limited by an obstructing stationary object 130. However, as further illustrated in FIG. 3, the infrastructure node 102 does have a line-of-sight 136 from at least one infrastructure sensor 104 to the mobile object 128.

The infrastructure computer 108 can include programming to detect a mobile object 128 such as a vehicle 112 approaching a limited operation zone 132 of a travel area 126. IN the illustration of FIGS. 2 and 3, the vehicle 112C is approaching the limited operation zone 126. "Approaching" in this context means that the object 128 is outside the limited operation zone 132, and that a distance of the mobile object 128 from the limited operation zone 132 is detected to be decreasing over time and/or an intent of the object 128 to enter the limited operation zone 132 can be determined.

An infrastructure sensor 104 such as a radar or a lidar can provide data for an infrastructure computer 108 to determine that the mobile object 128 is approaching the limited operation zone 132. Alternatively or additionally, a mobile object 128 such as a vehicle 112 including a vehicle communication module 122 could send a message, e.g., using any suitable V2X communication protocol, that is receivable by the infrastructure communication module 106 specifying that the vehicle 112 is approaching the limited operation zone 132. The message could additionally include other information, such as a type of vehicle 112 propulsion (e.g., electric, internal combustion, human powered, etc.), and sensing and control capabilities of the vehicle 112, e.g., whether the vehicle 112 is equipped with vehicle sensors 118 to detect mobile objects 128 and/or stationary objects 130 and whether the vehicle 112 includes a vehicle computer 116 that can implement control commands. In the present context, a control command to a vehicle 112 is a command to control vehicle subsystems 120 such as propulsion, braking and steering, including control commands provided by the infrastructure computer 108, typically via the infrastructure communication module 106.

Based on a message from a vehicle 112 and/or some other mechanism, the infrastructure computer 108 can determine that the vehicle 112 is able to execute wirelessly received control commands from the infrastructure computer 108. For example, another mechanism could be a marking or indicia on the vehicle 112 detectable by an infrastructure camera specifying that the vehicle 112 is or is not capable of accepting and executing control commands from the infrastructure computer 108. That is, upon detecting and decoding a marking, e.g., using conventional pattern recognition techniques to identify markings such as QR CODES®, block letters, image icons, etc., the infrastructure computer 108 could determine that a vehicle 112 is, or alternatively is not, capable of receiving and executing control commands. Further, an infrastructure sensor 104 could provide an image of a vehicle 112, and the infrastructure computer 108 could use conventional pattern recognition techniques to identify a type of vehicle 112, and then determine, e.g., determine that the vehicle 112 is or is not capable of accepting and executing wireless control commands.

The infrastructure computer 108 can further determine whether an object such as the mobile object 128 shown in FIGS. 2 and 3 is present in the limited operation zone 132. If so, the infrastructure computer 108 can identify the object, e.g., according to an object type. In this manner, the infrastructure computer 108 can identify an object within the limited operation zone 132. Further, the infrastructure computer 108 may further be able to determine a location and/or orientation of vehicles 112 and other objects including mobile objects 128 in a travel area 126. For example, the infrastructure computer 108 could receive data from infrastructure sensors 104 and utilize suitable techniques for pose estimation, e.g., according to known algorithms that use one or more of two-dimensional color image (RGB) data, a point cloud (i.e., including depth data such as lidar data or time-of-flight data), or a combined RGB-D sensor. In one example, the infrastructure computer 108 could receive two-dimensional data and using suitable techniques, such as YOLO (you-only-look-once) or faster-RCNN algorithms, make an initial post determination, and then and refine the initial determination based on the 3D point cloud data, e.g., using Iterative Closest Point (ICP) or Normal Distributions Transform (NDT) techniques.

In the present context, an object type specifies whether the object is a mobile object 128 or a stationary object 130, and, if the object is a mobile object 128, whether the object is capable of receiving and executing control commands. In object type could further classify an object, e.g., a mobile object 128 could be classified as human-powered or machine powered, as non-vehicle (e.g., pedestrian) or vehicle, etc. As explained above, an object type could be determined by infrastructure sensor 104 data, e.g., by the infrastructure computer 108 using pattern recognition techniques to identify an object, e.g., a type of the object, from an image acquired by the infrastructure sensor 104. Further, an object type of a vehicle 112 able to accept control commands could be determined by communication between the infrastructure communication module 106 and the vehicle communication module 122, e.g., the vehicle 112 could send or broadcast a message specifying its vehicle 112 type and/or capability of receiving and executing control commands. The infrastructure computer 108 could store a lookup table or the like associating indicia provided on or affixed to mobile objects with an object type, and or associating a determination that a pattern in an image is classified as a certain object, e.g., a pedestrian, a human pushcart, a human-operated cart or equipment, etc., with an object type, e.g., not capable of receiving and executing control commands. Further, the infrastructure computer 108 could be programmed to determine that an object type includes being not capable of receiving and executing control commands at the infrastructure computer 108 is unable to identify an object and/or a type of the object.

Based on identifying a mobile object 128 within the limited operation zone 132, and if the vehicle 112 is determined to be capable of accepting control commands, then the infrastructure computer can control a vehicle 112 by providing a control command via wireless communications. However, if the infrastructure computer 108 determines that the vehicle 112 is unable to execute the wireless commands from the computer, the infrastructure computer 108 can then suppress the control command to the vehicle 112.

If the vehicle 112 approaching a limited operation zone 132 is determined to be able to accept control commands, then the control command can include whether the vehicle is permitted to enter the limited operation zone 132, i.e., the control command can specify that the vehicle is or is not permitted to enter the limited operation zone 132. For example, if the infrastructure computer determines that the mobile object within the limited operation zone 132 is unable to receive the wireless commands from the computer, a control command can then include a directive, i.e., a message including a command, for the vehicle 112 to halt prior to entering the limited operation zone 132. Further for example, If the infrastructure computer 108 determines that an identified mobile object 128 within the limited operation zone 132, and any second object identified in the limited operation zone 132, is able to execute the wireless control commands from the infrastructure computer 108, the infrastructure computer 108 can then provide to the vehicle 112 a control command that includes a permission or directive to enter the limited operation zone 132.

The infrastructure computer 108 could determine a present and/or predicted future location of an object such as a mobile object 128 in the limited operations zone. For example, the infrastructure computer 108 could store a map, e.g., according to a local or global coordinate system such as described above, of the limited operation zone 132. The infrastructure computer 108 could determine a location of an object using stationary infrastructure sensors 104, e.g., stereo cameras, radar, lidar, etc., whereby a distance of an object from an infrastructure node 102 in the direction of the distance could be determined using suitable techniques for interpreting sensor data. Further, the infrastructure computer

108 could predict a path of a mobile object 128, e.g., based on a current speed and heading of the mobile object 128. Additionally, the infrastructure computer 108 could predict multiple possible future locations for a mobile object 128, e.g., where the mobile object 128 is approaching an intersection of travel paths in the limited operation zone 132 and could turn in one and/or another direction and/or go straight.

Alternatively or additionally, a mobile object 128 and possibly its location and/or predicted future location(s) could be identified from a wireless transmission from a device co-located with the object. For example, a movable object could broadcast or send its location and/or intended path including one or more future locations to the infrastructure node 102. For example, a human user could carry a portable computing device 125 such as a smartphone, tablet, or the like that could include an application to transmit a location of the smart phone receivable by the infrastructure node 102, e.g., according to a wireless protocol such as Bluetooth or the like. Based on a determined location of an object in the limited operation zone 132, the infrastructure computer 108 could then provide a control command to a vehicle 112 including a directive to follow a path to avoid the location of the object. For example, the infrastructure computer could specify a location or locations for a vehicle 112 to avoid and/or could specify a path for the vehicle to follow to avoid the location or locations of a mobile object 128.

Further, in one example, the infrastructure computer 108 could provide continuing, e.g., real-time, control for a vehicle 112 as the vehicle 112 traveled through a limited operation zone 132. For example, the infrastructure computer 108 could determine a optimal path for the vehicle 112 through the limited operation zone 132 based on data from infrastructure sensors 104, and could then provide commands to the vehicle 112 to follow the path, adjusting the path in real-time or near real-time based on further infrastructure sensor 104 data.

A control command from the infrastructure computer 108 to a vehicle 112 can be based on a type of object. As mentioned above, as a threshold step, the infrastructure computer 108 can determine whether a mobile object 128 in a limited operation zone 132 is a type of the object that can accept a control command. For example, the computer could determine that the mobile object 128 is a vehicle 112. The infrastructure computer 108 could then determine that the vehicle 112 is able to accept a control command, e.g., by indicia on the vehicle 112 and/or receiving or detecting a communication from the vehicle 112, e.g., as described above. Further, the infrastructure computer 108 could similarly determine that the mobile object 128 is a vehicle 112 but is not able to receive a control command. For example, if a type of vehicle 112 is an unpowered cart, a powered cart operated by the human operator, the infrastructure computer 108 may determine that the vehicle 112 is not able to receive and execute a control command. Yet further, if a type of object is a bicycle or pedestrian, the infrastructure computer 108 may determine that the vehicle 112 is not able to receive and execute a control command.

The infrastructure computer 108 could determine, upon detecting a vehicle 112 approaching a limited operation zone 132, that the limited operation zone 132 is unoccupied. Based on the limited operations on being unoccupied, the infrastructure computer 108 could determine to allow the vehicle 112 to enter the limited operation zone 132, and could provide a control command accordingly.

Table 1 below provides an example of determinations that could be made by the infrastructure computer 108, and control commands that the infrastructure computer 108 could provide, or alternatively or additionally could determine to suppress, based on determining a presence and/or type of a mobile object 128 upon a vehicle 112 approaching a limited operation zone 132.

108 could determine that the vehicle 112 may proceed into the limited operation zone 132, whereupon the process 150 proceeds to a block 164.

In the block 162, infrastructure computer 108 determines a halt command for the vehicle 112. For example, the vehicle

TABLE 1

| Determination(s) | Control command(s) |
| --- | --- |
| Mobile object in limited operation zone cannot accept control command and cannot predict path based on object type | Halt prior to entering limited operation zone and wait (e.g., specified amount of time or until further command to allow mobile object to clear the zone) |
| Mobile object in limited operation zone cannot accept control commands but can predict mobile object path or location based on object type | Enter limited operation zone with path and/or speed restrictions |
| Mobile object in limited operation zone can accept control command | Enter limited operation zone (could include path and/or speed restrictions) |
| Limited operation zone is unoccupied | Enter limited operation zone |
| First approaching vehicle cannot receive control commands. | Suppress control command to approaching vehicle; halt or slow other vehicles approaching limited operation zone until first vehicle clears the zone. |

Figure 4:
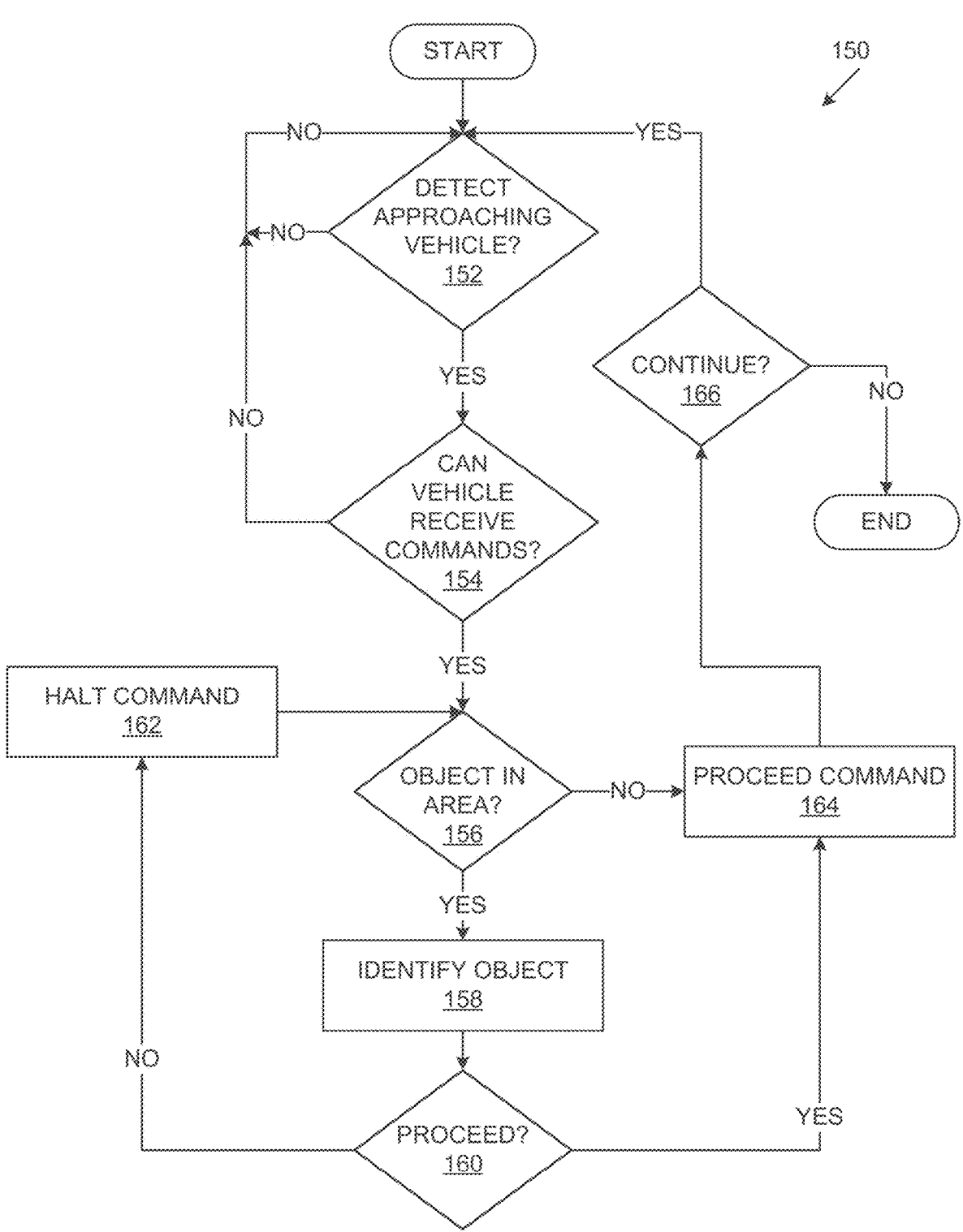
FIG. 4 is a process flow diagram of an example process for the traffic management system.

FIG. 4 is a process flow diagram of an example process 150 for the traffic management system 100. The process 150 may be executed in an infrastructure computer 108. It is to be appreciated that the process 150 is provided as an example, and that a different order of steps and/or different steps could be within the scope and spirit of the present disclosure.

The process 150 begins in a decision block 152, in which the infrastructure computer 108 determines whether it detects an approaching vehicle 112. That is, the decision block 152 represents a scanning or monitoring process in which the infrastructure computer 108 receives data from infrastructure sensors 104 and/or the infrastructure communication module 106 indicating an approaching vehicle 112 as described above. If an approaching vehicle 112 is detected, then the process 150 proceeds to a block 154. Otherwise, the process 150 remains in the block 152.

In the decision block 154, the infrastructure computer 108 determines whether the vehicle 112 detected in the block 152 can receive and execute control commands. If not, the infrastructure computer 108 suppresses control commands to the vehicle 112, and returns to the block 152. If so, the process 150 proceeds to a block 156.

In the decision block 156, the infrastructure computer 108 determines whether an object such as a mobile object 128 is present in the limited operation zone 132, e.g., a mobile object 128 as explained above. If yes, the process 150 proceeds to a block 158. If no, the process 150 proceeds to a block 162.

In the block 158, the infrastructure computer 108 can identify the object, typically including at least a type of the object as described above.

Next, in a decision block 160, the infrastructure computer 108 determines, based on a detected mobile object 128 in the limited operation zone 132, whether the vehicle 112 detected in the block 152 can proceed into the limited operation zone 132. For example, as explained above, based on a detected type of object, e.g., a pedestrian, bicycle, human operated cart, etc., the infrastructure computer 108 could determine that the vehicle 112 should not proceed into the limited operation zone 132, whereupon the process 150 proceeds to a block 162. On the other hand, the infrastructure computer

112 could be commanded to halt until a further control command, whereupon the process 150 would then return to the decision block 156. Alternatively, the infrastructure computer 108 could determine to provide a halt command, and, based on a predicted path of the mobile object 128 in the limited operation zone 132, provide a time at which the vehicle 112 could resume motion, after which the process 150 could return to the block 156 or alternatively, although not illustrated, could proceed to a decision block 166.

In the block 164, the infrastructure computer 108 determines a control command for the vehicle 112 to proceed. For example, the infrastructure computer 108 could simply command the vehicle 112 to proceed based on an intended or predicted path for the vehicle 112, and/or based on the vehicle 112 determining its path in the limited operation zone 132 taking into account the mobile object 128. As another example, as described above, the control command could specify for the vehicle 112 to proceed with a modified or adjusted path and/or speed. Following the block 164, the process 150 proceeds to a block 166.

In the block 166, the infrastructure computer 108 determines whether the process 150 is to continue, e.g., the process 150 could be limited to specified times of day, could be activated or deactivated based on user input, etc. thus, the process 150 can either continue in the block 152, or can end following the block 166.

The term "exemplary" is used herein in the sense of signifying an example, e.g., a reference to an "exemplary widget" should be read as simply referring to an example of a widget.

Use of "in response to," "based on," and "upon determining" herein indicates a causal relationship, not merely a temporal relationship.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

The invention claimed is:

1. A system, comprising a computer that includes a processor and a memory, the memory storing instructions executable by the processor, including instructions to:
   detect a vehicle approaching a limited operation zone of a travel area;
   upon identifying an object within the limited operation zone, determine that the object is one of able or not able to receive wireless commands from the computer to control a path of the object; and
   based on identifying the object within the limited operation zone and determining that the object is not able to receive the wireless commands from the computer to control the path of the object, control the vehicle by providing a control command via wireless communications, the control command including whether the vehicle is permitted to enter the limited operation zone.

2. The system of claim 1, the instructions further including instructions to suppress the control command to the vehicle upon determining that the vehicle is unable to execute the wireless commands from the computer.

3. The system of claim 1, wherein the control command includes a directive for the vehicle to halt prior to entering the limited operation zone upon a determination that the object is not able to receive the wireless commands from the computer.

4. The system of claim 1, the instructions further including instructions to determine that a second object identified in the limited operation zone is able to execute the wireless commands from the computer, wherein, upon a determination that the object is able to receive the wireless commands from the computer, the control command then includes a permission to enter the limited operation zone.

5. The system of claim 1, the instructions further including instructions to determine a location of the object, wherein the control command includes a directive to follow a path to avoid the location of the object.

6. The system of claim 5, wherein the location of the object is a location on a predicted path of the object.

7. The system of claim 1, the instructions further including instructions to determine a type of the object, wherein the control command is based in part on the type of the object.

8. The system of claim 1, the instructions further including instructions to determine that the limited operation zone is unoccupied, wherein the control of the vehicle includes permitting the vehicle to enter the limited operation zone based on the limited operation zone being unoccupied.

9. The system of claim 1, the instructions further including instructions to detect the vehicle from data provided from a stationary sensor.

10. The system of claim 1, the instructions further including instructions to identify the object from a wireless transmission from a device co-located with the object.

11. The system of claim 10, wherein the object is a human user, and the device co-located with the object is a portable computing device.

12. The system of claim 10, wherein the object is a second vehicle, and the device co-located with the object is a vehicle communication module.

13. A method, comprising:
   detecting a vehicle approaching a limited operation zone of a travel area;
   upon identifying an object within the limited operation zone, determining that the object is one of able or not able to receive wireless commands from the computer to control a path of the object; and
   based on identifying the object within the limited operation zone and that the object is not able to receive the wireless commands from the computer to control the path of the object, controlling the vehicle by providing a control command via wireless communications, the control command including whether the vehicle is permitted to enter the limited operation zone.

14. The method of claim 13, further comprising suppressing the control command to the vehicle upon determining that the vehicle is unable to execute the wireless commands from the computer.

15. The method of claim 13, further comprising, upon determining that the object within the limited operation zone is unable to receive the wireless commands from the computer, including in the control command a directive for the vehicle to halt prior to entering the limited operation zone.

16. The method of claim 13, further comprising determining that a second object identified in the limited operation zone is able to execute the wireless commands from the computer, wherein, upon a determination that the object is able to receive the wireless commands from the computer, the control command then includes a permission to enter the limited operation zone.

17. The method of claim 13, further comprising determining a location of the object, wherein the control command includes a directive to follow a path to avoid the location of the object.

18. The method of claim 13, further comprising determining a type of the object, wherein the control command is based in part on the type of the object.

19. The method of claim 13, further comprising determining that the limited operation zone is unoccupied, wherein the control of the vehicle includes permitting the vehicle to enter the limited operation zone based on the limited operation zone being unoccupied.

20. The method of claim 13, further comprising detecting the vehicle from data provided from a stationary sensor.

* * * * *